United States Patent
Shima

(10) Patent No.: US 8,584,116 B2
(45) Date of Patent: Nov. 12, 2013

(54) INSTALLING METHOD, INSTALLER, AND INSTALLING PROGRAM

(75) Inventor: Masato Shima, Kawasaki (JP)

(73) Assignee: NEC Infrontia Corporation, Kawasaki-Shi, Kanagawa (JP)

( * ) Notice: Subject to any disclaimer, the term of this patent is extended or adjusted under 35 U.S.C. 154(b) by 947 days.

(21) Appl. No.: 12/334,138

(22) Filed: Dec. 12, 2008

(65) Prior Publication Data

US 2009/0158271 A1    Jun. 18, 2009

(30) Foreign Application Priority Data

Dec. 13, 2007    (JP) ................................. 2007-322132

(51) Int. Cl.
*G06F 9/445*    (2006.01)

(52) U.S. Cl.
USPC ........... 717/174; 717/168; 717/169; 717/170; 717/171; 717/172; 717/173

(58) Field of Classification Search
USPC ................................................. 717/168–178
See application file for complete search history.

(56) References Cited

U.S. PATENT DOCUMENTS

| | | | | |
|---|---|---|---|---|
| 5,966,540 | A * | 10/1999 | Lister et al. ................... | 717/174 |
| 6,167,567 | A * | 12/2000 | Chiles et al. ................... | 717/173 |
| 6,345,386 | B1 * | 2/2002 | Delo et al. ..................... | 717/176 |
| 7,320,128 | B2 | 1/2008 | Hirai | |
| 7,703,022 | B2 * | 4/2010 | Arthurs et al. ................. | 715/742 |
| 2003/0212982 | A1 * | 11/2003 | Brooks et al. ................. | 717/100 |
| 2004/0205167 | A1 * | 10/2004 | Grumann ...................... | 709/220 |
| 2007/0240148 | A1 | 10/2007 | Inada | |
| 2007/0245344 | A1 * | 10/2007 | Kumagai et al. .............. | 717/174 |
| 2009/0158271 | A1 * | 6/2009 | Shima ........................... | 717/174 |

FOREIGN PATENT DOCUMENTS

| | | |
|---|---|---|
| JP | 07-064771 | 3/1995 |
| JP | 2001-337816 A | 12/2001 |
| JP | 2002-055821 | 2/2002 |
| JP | 2004-234481 A | 8/2004 |
| JP | 2004-302929 A | 10/2004 |
| JP | 2006-133825 A | 5/2006 |
| JP | 2007-213343 | 8/2007 |
| JP | 2007-280274 A | 10/2007 |

* cited by examiner

*Primary Examiner* — Anna Deng
*Assistant Examiner* — Brahim Bourzik
(74) *Attorney, Agent, or Firm* — Dickstein Shapiro LLP

(57) ABSTRACT

An installer generates an application list containing application program type of each application, generates, based on the application list, a configuration file containing predetermined items set for all the installed applications and predetermined item set for respective installed applications, sets a common item in a registry, sets the number of installed applications and the like as attributes of the common item, sets an item for each application immediately under the common item, sets program installation folder and the like as attributes of the item set for each application, sets the number of installed applications in the field of number of installed applications in the registry using a computer, sets a value of an IP address in the field of IP address in the registry, and installs selected applications.

9 Claims, 12 Drawing Sheets

| APPLICATION TYPE | APPLICATION PROGRAM TYPE | PRESENCE OR ABSENCE OF COMMUNICATION WITH CPU | NECESSITY OR UNNECESSITY OF REBOOT AFTER INSTALLATION | DEFAULT INSTALLATION FOLDER/FILE NAME | DEFAULT ICON FOLDER/FILE NAME |
|---|---|---|---|---|---|
| APPLICATION 1 | PC APPLICATION | PRESENCE | UNNECESSITY | C:/PROGRAM FILES/ APPLICATION NAME/FILE NAME | C:/PROGRAM FILES/ APPLICATION NAME/ICONS/ FILE NAME |
| APPLICATION 2 | BROWSER APPLICATION | URL:XXXXX | UNNECESSITY | – | – |
| APPLICATION 3 | PC APPLICATION | ABSENCE | NECESSITY | C:/PROGRAM FILES/ APPLICATION NAME/FILE NAME | C:/PROGRAM FILES/ APPLICATION NAME/ICONS/ FILE NAME |
| APPLICATION 4 | BROWSER APPLICATION | URL:YYYYY | UNNECESSITY | – | – |
| ⋮ | | | | | |

FIG.3

| APPLICATION TYPE | APPLICATION PROGRAM TYPE | PRESENCE OR ABSENCE OF COMMUNICATION WITH CPU | NECESSITY OR UNNECESSITY OF REBOOT AFTER INSTALLATION | DEFAULT INSTALLATION FOLDER/FILE NAME | DEFAULT ICON FOLDER/FILE NAME |
|---|---|---|---|---|---|
| APPLICATION 1 | PC APPLICATION | PRESENCE | UNNECESSITY | C:/PROGRAM FILES/ APPLICATION NAME/FILE NAME | C:/PROGRAM FILES/ APPLICATION NAME/ICONS/ FILE NAME |
| APPLICATION 2 | BROWSER APPLICATION | URL:XXXX | UNNECESSITY | – | – |
| APPLICATION 3 | PC APPLICATION | ABSENCE | NECESSITY | C:/PROGRAM FILES/ APPLICATION NAME/FILE NAME | C:/PROGRAM FILES/ APPLICATION NAME/ICONS/ FILE NAME |
| APPLICATION 4 | BROWSER APPLICATION | URL:YYYY | UNNECESSITY | – | – |
| .... | | | | | |

FIG.4

```
[NUMBER OF APPLICATIONS]   10              ;NUMBER OF APPLICATIONS FOR ALL MARKETS
[MARKET]                   NORTH AMERICA   ;SPECIFIED MARKET

[APPLICATION NAME1]        APPLICATION 1   ;APPLICATION NAME
[USAGE]                    YES             ;RELEASED OR NOT RELEASED
[PROGRAM TYPE]             PC              ;PROGRAM TYPE (PC OR BROWSER)
[CPU COMMUNICATION]        YES             ;PRESENCE OR ABSENCE OF COMMUNICATION WITH CPU
[REBOOT REQUIREMENT]       NO              ;NECESSITY OR UNNECESSITY OF REBOOT AFTER INSTALLATION
[PROGRAM FILES PATH]       C:/WINDOWS/PROGRAM FILES/APPLICATION 1/...;PROGRAM INSTALLATION PATH
[ICON PATH]                C:/WINDOWS/PROGRAM FILES/APPLICATION 1/...;ICON INSTALLATION PATH

[APPLICATION NAME2]        APPLICATION 2
[USAGE]                    YES
[PROGRAM TYPE]             BROWSER
[CPU COMMUNICATION]        NO
[REBOOT REQUIREMENT]       NO
[PROGRAM FILES PATH]       NA
[ICON PATH]                NA

[APPLICATION NAME3]        APPLICATION 3
         . . .
```

INSTALLING METHOD, INSTALLER, AND INSTALLING PROGRAM

RELATED APPLICATIONS

This application is based upon and claims the benefit of priority from Japanese patent application No. 2007-322,132, filed on Dec. 13, 2007, the disclosure of which is incorporated herein in its entirety by reference.

BACKGROUND OF THE INVENTION

1. Field of the Invention

The present invention relates to an installing method, an installer, and an installing program which are used for installing an application (computer program) and the like onto a computer and, more particularly, to an installing method, an installer, and an installing program used for installing a plurality of application onto a computer at once.

2. Description of the Related Art

In recent years, a large number of applications are released for competitive differentiation or for meeting growing demand for solution provision.

However, it is impossible for a single software vendor to develop all required applications and therefore there is often a case where the software vendor provides (sells), to end users, applications that have already been developed by associated domestic/foreign vendors or other vendors. In such a case, when applications developed by different vendors are installed onto a single PC (personal computer), integrity is lost due to a difference between individual installers or GUIs, which may make users distrustful of the applications.

[Patent Document 1] JP2002-055821A
[Patent Document 2] JP2007-213343A
[Patent Document 1] JP07-064771A FIG. 1 shows a system including a button telephone apparatus A having a CPU A-1 (IP address: 1.2.3.4) that manages a switch function, an application server C-1 on which a Web application (URL (Uniform Resource Locator): YYYY) is mounted, an application server C-2 on which a Web application (URL (Uniform Resource Locator): ZZZZ) is mounted, and a user PC B.

Conventionally, in the case where a plurality of application including an application 1 (PC reboot after installation: necessary) implemented by communicating with the CPU A-1, an application 2 (PC reboot after installation: unnecessary) implemented by communicating with the CPU A-1, an application n (PC reboot after installation: necessary) that does not communicate with the CPU A-1 are installed onto the user PC B for setting the Web application of the application server C-1, the applications 1, 2, n need to be installed individually (first problem).

Further, in the case where the applications are installed individually, even if data (e.g., IP address of the CPU A-1 which is a communication partner of the user PC B) to be specified at the installation time is the same between the applications to be installed, setting of the data needs to be made for each application. Further, a reboot of the PC needs to be carried out every time an application requiring PC reboot after installation is installed (Second problem).

In the case where a program of the Web application server is utilized on a browser, there is no application that needs to be installed especially onto the user PC B but a browser setting needs to be made on the user PC B. The browser setting differs from the setup method for a common PC application, which embarrasses the user in performing setup tasks (third problem).

SUMMARY OF THE INVENTION

An object of the present invention is therefore to provide an installing method, an installer, and an installing program capable of collectively and easily installing a plurality of applications.

According to a first aspect of the present invention, there is provided an installer including: a means for generating, through a user operation on a computer, an application list containing application program type (PC application or browser application) of each application, presence or absence of communication with a CPU of a button telephone apparatus, necessity or unnecessity of PC reboot after installation, default installation folder/program name, default icon folder/program name and recording the generated application list in a storage medium; a means for using a computer to generate, based on the application list, a configuration file containing, for all the installed applications, the total number of applications and specified market and containing, for respective installed applications, application name, information indicating whether the application is released or not into a specified market, application program type (PC application or browser application), presence or absence of communication with the CPU of the button telephone apparatus, necessity or unnecessity of reboot after installation, program installation path, and icon installation path and recording the generated configuration file in a storage medium; a means for using a computer to set a common item in a registry, set the number of installed applications and IP address of the CPU of the button telephone apparatus as attributes of the common item, set an item for each application immediately under the common item, set program installation folder/file name and icon installation folder/file name as attributes of the item set for each application; a means for using a computer to set, in the field of number of installed applications in the registry, information indicating whether the application is released or not into a specified market and number of installed applications which has been determined based on user's selection; a means for using a computer to set a value of the IP address input by the user in the field of IP address in the registry; and an installation means for using a computer to install applications selected by the user, in which the installation means performs installation based on an MSI file for an application whose application program type is PC application; while, for an application whose application program type is browser application, the installation means sets a shortcut for connecting to the URL input by the user and an icon of the shortcut and sets the set destinations of the shortcut and icon in the registry, and in the installation based on the MSI file, the installation means sets, as needed, the IP address that has been set in the registry in the configuration of the application to be installed in the PC.

According to a second aspect of the present invention, there is provided an installing method including: a step of generating, through a user operation on a computer, an application list containing application program type (PC application or browser application) of each application, presence or absence of communication with a CPU of a button telephone apparatus, necessity or unnecessity of PC reboot after installation, default installation folder/program name, default icon folder/program name and recording the generated application list in a storage medium; a step of using a computer to generate, based on the application list, a configuration file containing, for all the installed applications, the total number of applications and specified market and containing, for respective installed applications, application name, information indicating whether the application is released or not into a specified market, application program type (PC application or browser application), presence or absence of communication with the CPU of the button telephone apparatus, necessity or unnecessity of reboot after installation, program installation path, and icon installation path and recording the generated configuration file in a storage medium; a step of using a computer to set a common item in a registry, set the number of installed applications and IP address of the CPU of the button telephone apparatus as attributes of the common item, set an item for each application immediately under the common item, set program installation folder/file name and icon installation folder/file name as attributes of the item set for each application; a step of using a computer to set, in the field of number of installed applications in the registry, information indicating whether the application is released or not into a specified market and number of installed applications which has been determined based on user's selection; a step of using a computer to set a value of the IP address input by the user in the field of IP address in the registry; and an installation step of using a computer to install applications selected by the user, in which in the installation step, installation is performed based on an MSI file for an application whose application program type is PC application; while, for an application whose application program type is browser application, a shortcut for connecting to the URL input by the user and an icon of the shortcut are set, and the set destinations of the shortcut and icon are set in the registry, and in the installation based on the MSI file, the IP address that has been set in the registry is set as needed in the configuration of the application to be installed in the PC.

Further, according to a third aspect of the present invention, there is provided an installing program for allowing a computer to function as an installer including: a means for generating, through a user operation on a computer, an application list containing application program type (PC application or browser application) of each application, presence or absence of communication with a CPU of a button telephone apparatus, necessity or unnecessity of PC reboot after installation, default installation folder/program name, default icon folder/program name and recording the generated application list in a storage medium; a means for using a computer to generate, based on the application list, a configuration file containing, for all the installed applications, the total number of applications and specified market and containing, for respective installed applications, application name, information indicating whether the application is released or not into a specified market, application program type (PC application or browser application), presence or absence of communication with the CPU of the button telephone apparatus, necessity or unnecessity of reboot after installation, program installation path, and icon installation path and recording the generated configuration file in a storage medium; a means for using a computer to set a common item in a registry, set the number of installed applications and IP address of the CPU of the button telephone apparatus as attributes of the common item, set an item for each application immediately under the common item, set program installation folder/file name and icon installation folder/file name as attributes of the item set for each application; a means for using a computer to set, in the field of number of installed applications in the registry, information indicating whether the application is released or not into a specified market and number of installed applications which has been determined based on user's selection; a means for using a computer to set a value of the IP address input by the user in the field of IP address in the registry; and an installation means for using a computer to install applications selected by the user, in which the installation means performs installation based on an MSI file for an application whose application program type is PC application; while, for an application whose application program type is browser application, the installation means sets a shortcut for connecting to the URL input by the user and an icon of the shortcut and sets the set destinations of the shortcut and icon in the registry, and in the installation based on the MSI file, the installation means sets, as needed, the IP address that has been set in the registry in the configuration of the application to be installed in the PC.

According to the present invention, it is possible to collectively install a plurality of applications. Therefore, a single GUI can be shared between applications, eliminating the need to reboot a computer every time applications are installed. As a result, it is possible to reduce the number of setting operations of parameters common to applications down to one.

BRIEF DESCRIPTION OF THE DRAWINGS

FIG. 3 is a view showing a concrete example of an application list generated in the embodiment of the present invention;

FIG. 4 is a view showing a concrete example of a configuration list generated in the embodiment of the present invention;

DETAILED DESCRIPTION OF THE PREFERRED EMBODIMENTS

A preferred embodiment for practicing the present invention will be described below with reference to the accompanying drawings.

There is provided, in the present invention, a function of installing a plurality of applications which is implemented using a common installer, a function of preventing a duplicated setting, and a link function between applications so as to ease a user's distrust.

Figure 1:
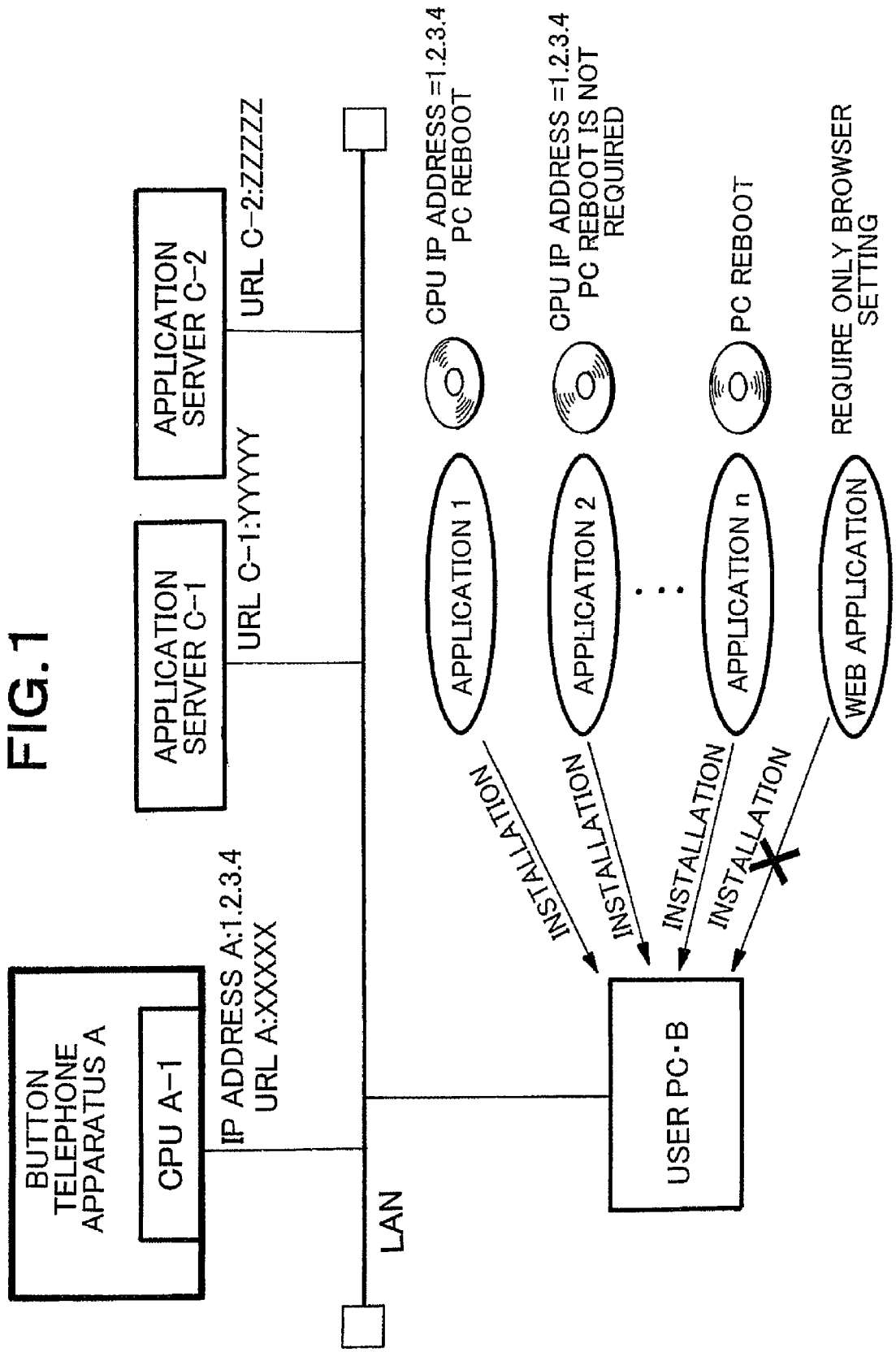
FIG. 1 is a conceptual view for explaining a conventional installing method of a plurality of applications.
Figure 2:
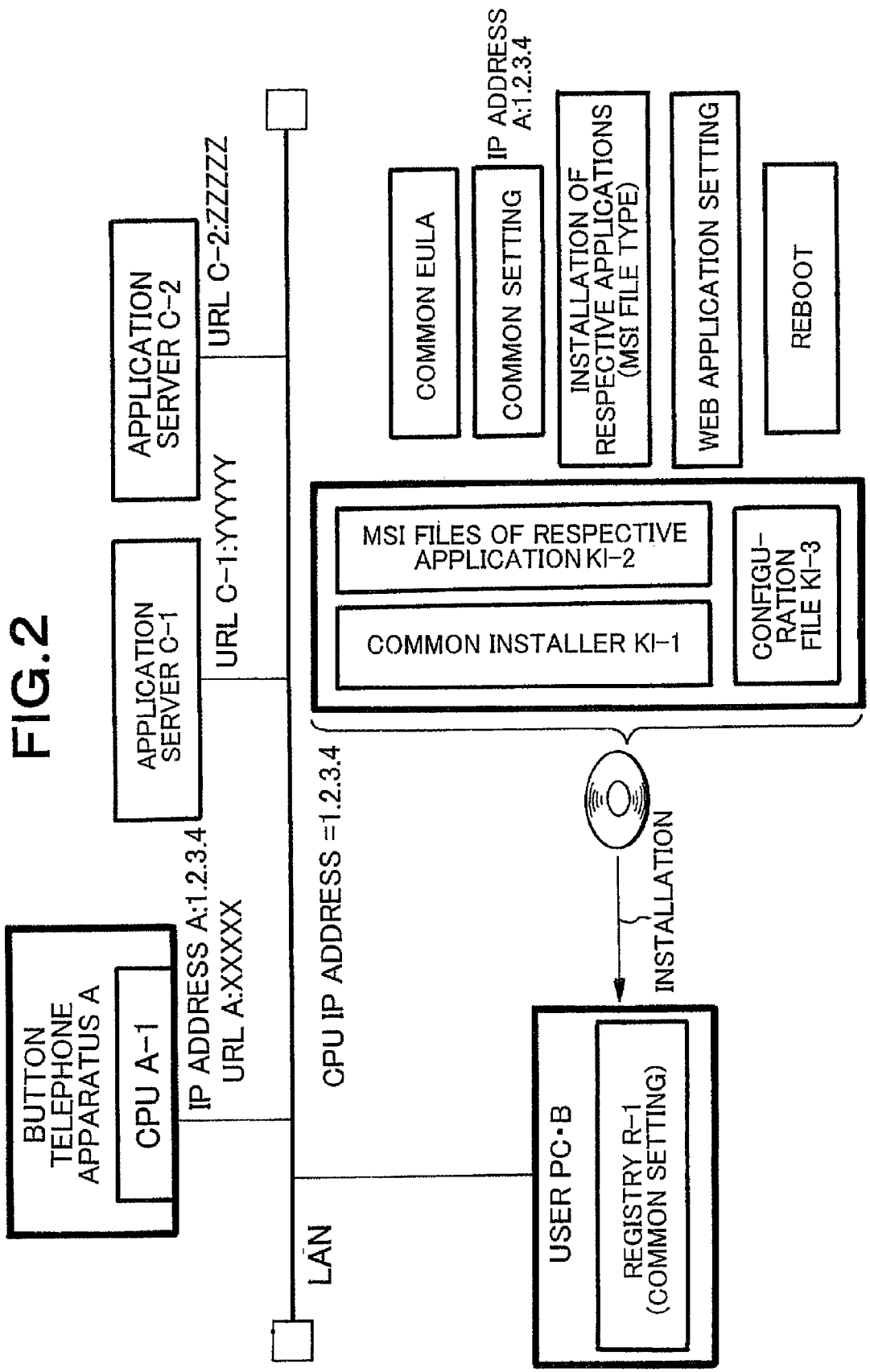
FIG. 2 is a conceptual view for explaining an installing method of a plurality of applications according to an embodiment of the present invention.

In a system shown in FIG. 2, a common installer KI-1 shared by all applications to be installed onto a user PC, a configuration file KI-3 in which a condition of each application is described, and an installer (MSI) file of each application are provided so as to store, in the registry of the user PC, IP address of the CPU A-1 or user specifying data in the installation folder of a program. This allows handling of a plurality of applications according to a common architecture. Further, it is possible to reduce the number of reboots down to one. The MSI file is an installation image file used in distribution of Windows® applications and the like. The MSI file includes exe file, dll file, resource, registrar, various setup information and the like. The common installer KI-1 takes out a file or setting information from the MSI file so as to set it in the system. The "EULA" of the common EULA shown in FIG. 2 is the abbreviation of "End User License Agreement".

The common installer is provided also for the Web application, as in the case of the PC application, so as to solve the above three problems.

In recent years, not only a specific function but also a solution-providing (problem-solving) function has been required for a communication apparatus including the button telephone apparatus. In other words, the number of solution support services realized by integration of a single communication apparatus and customer's data network has been increased. As a result, the number of applications to be installed onto a customer's PC is increased. In view of this, the present invention intends to define a rule for installation of a plurality of applications so as to complete installation of a plurality of applications in a single installation operation and to allow installation of a plurality of applications to be carried out in a uniform manner regardless of application type (Windows® application/browser application). Further, the present invention intends to provide an installer program having a feature of completing setting and operation only in a single procedure.

The configuration file KI-3 will first be described.

As shown in FIG. 3, a list containing, as items, application program type (PC application/browser application) of application to be installed onto the user PC, presence or absence (in the case of Web application, URL address) of communication with the CPU of the button telephone apparatus, necessity or unnecessity of PC reboot after installation, default program installation folder/file name, default icon folder/file name is created. This list is referred to as "application list". The application list is created by a user operating a computer and is stored in a recording medium.

Subsequently, the configuration file KI-3 shown in FIG. 4 is created based on the above application list and is stored in a storage medium.

The configuration file KI-3 sets a target for all markets into which the products are sold to register the total number of applications to be installed onto the user PC with an identifier of [Number of Application] and information concerning the market with an identifier [Market].

Thereafter, type/condition is set for respective applications ([Application Name n] (n is a natural number starting from 1)) targeting all markets. In [Usage], YES is registered when a relevant application is released to the market specified by [Market] and NO is registered when a relevant application is not released to the market specified by [Market] (i.e., when the application is for another market).

Ongoingly, based on the application list, the following items concerning type/condition are registered. That is, application program type (PC application, or browser application) is registered with an identifier [program Type], presence or absence of communication with the CPU of the button telephone apparatus is registered with an identifier [CPU Communications], necessity or unnecessity (YES/NO) of reboot after installation is registered with an identifier [Reboot requirement], default installation path/file name is registered with an identifier [Program Files Path], and default icon path/file name is registered with an identifier [Icon path]. However, in the case where the application program type is browser application, installation of a program is not actually performed, so that NA is registered in [Program Files Path] and [Icon Path].

Figure 5:
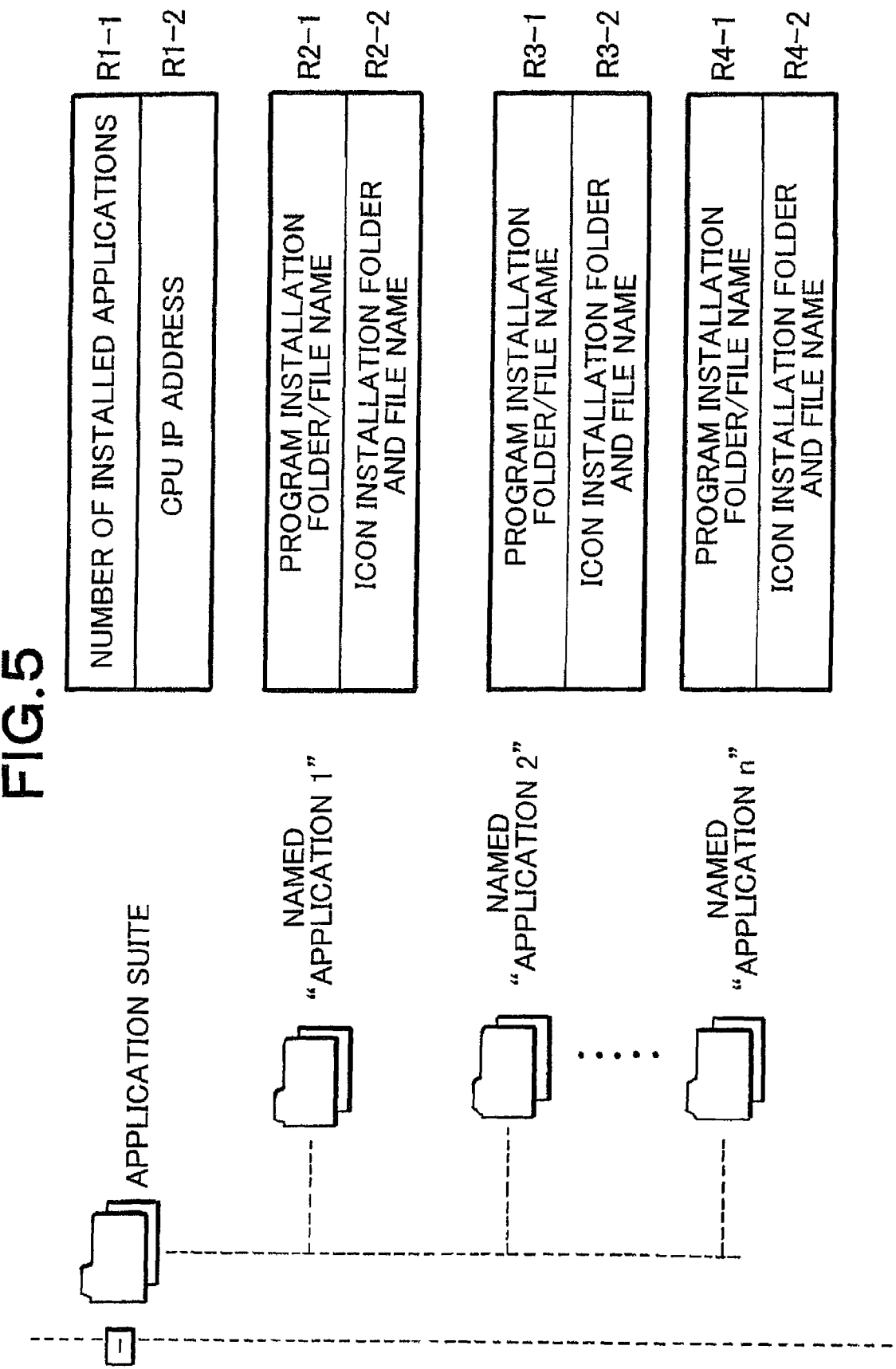
FIG. 5 is a view showing a concrete example of a registry table generated in the embodiment of the present invention.

Next, with reference to FIG. 5, a data structure of the registry of Windows® in a state where the applications have been installed will be described. A folder named "Application Suite (tentative name)" is created in the registry as information shared between the installed applications, and the number of applications that have been installed by a common installer and user specifying CPU IP address are registered in the "Application Suite". Subsequently, folders each having the name of installed application are created immediately under the "Application Suite", and program installation folder/file name (name of a folder to which the program is actually installed and an execution file name), and icon installation folder/file name are registered in each folder.

Figure 6:
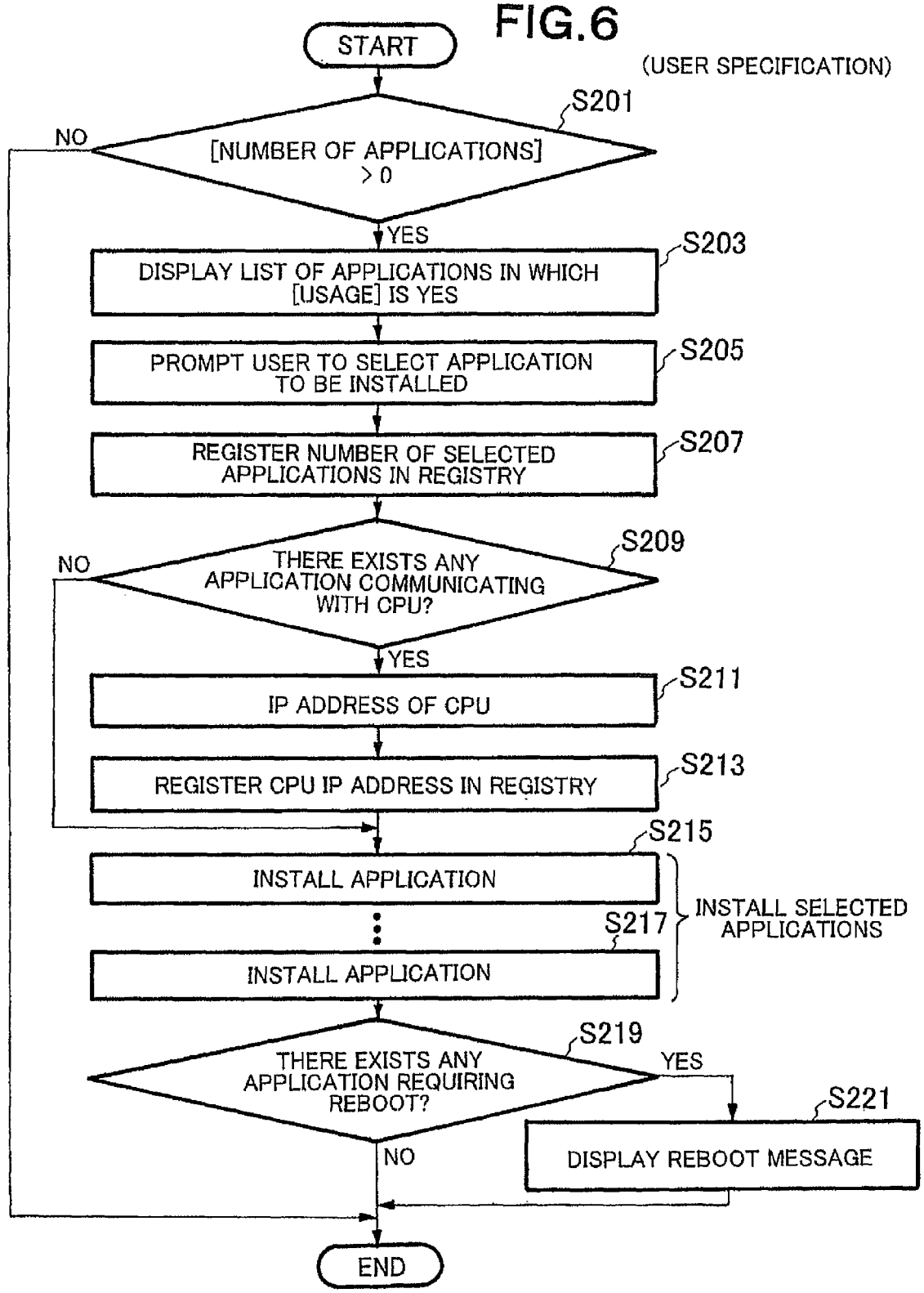
FIG. 6 is a flowchart showing operation of an installer according to the embodiment of the present invention.

Next, with reference to FIG. 6, a processing flow of the common installer will be described.

The configuration file is checked to determine whether any application exists ([Number of Applications]≥0) (step S201). If not exists ([Number of Applications]<0), this processing flow is ended.

Subsequently, all the applications ([Usage]=Yes) released to a target market are displayed (step S203) so as to prompt a user to select an application to be installed (step S205).

Then, the total number of applications that the user has selected is registered in the registry (number of installed applications (R1-1)) (see FIG. 5) of the PC (step S207).

Then, the configuration files of the applications that the user has selected is checked to determine whether there exists at least one application in which presence or absence of communication with the CPU of the button telephone apparatus is YES (step S209). If exists, a CPU IP address input screen is displayed so as to prompt the user to specify the IP address of the CPU (step S211).

Then, the specified IP address of the CPU is registered in the registry (CPU IP address (R1-2)) (see FIG. 5) of the PC (step S213).

Subsequently, the applications selected by the user are installed for execution (steps S215 to S217). After completion of the installation of all the selected applications, the configuration file is checked to determine whether the installed applications include at least one application in which necessity or unnecessity of reboot after installation is "YES" ([Reboot Requirement]=Yes) (step S219). If exists, a message prompting the user to reboot the PC is displayed (step S221), and the common installer is ended.

Figure 7:
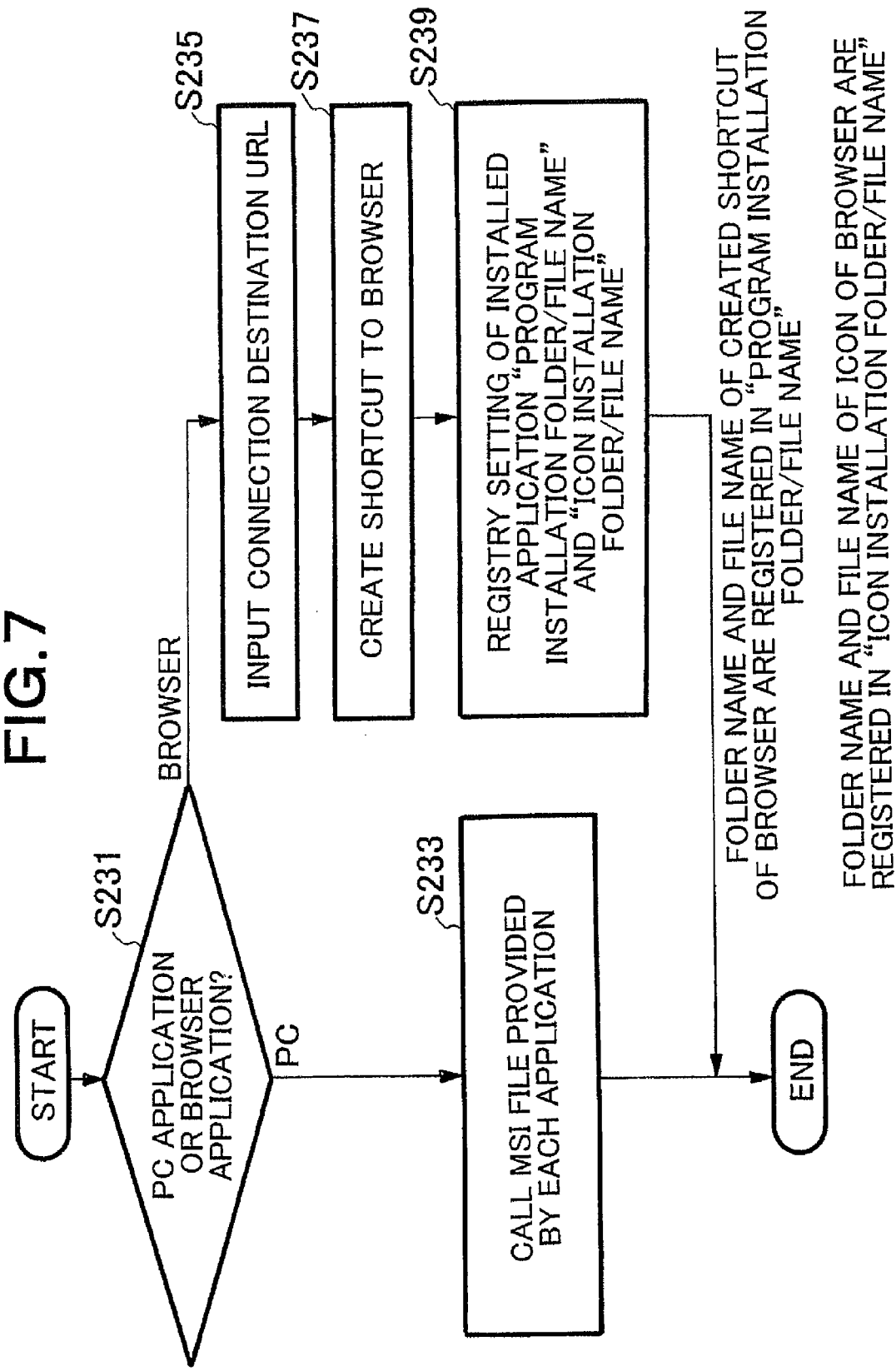
FIG. 7 is a flowchart showing detailed operation of installation processing of the applications shown in FIG. 6.

Next, with reference to FIG. 7, an application installation processing flow will be described.

The configuration file is checked to determine whether an application to be installed is a PC application ([Program Type]=PC) or a browser application ([Program Type]= browser) (step S231). In the case where the application to be installed is a PC application, an installer (MSI file) provided by each application is executed (step S233). In the case where the application to be installed is a browser application, an input screen of the URL of an application server to be accessed is displayed so as to prompt the user to specify the URL thereof (step S235).

A shortcut to a browser with the specified URL is created on the desktop based on the input URL (step S237). Then, the folder and file names of the shortcut of the browser are registered in the registry (program installation folder/file name) (see FIG. 5) of the PC, and the folder and file names of the icon of the browser are registered in the registry (icon installation folder/file name) (step S239).

Figure 8:
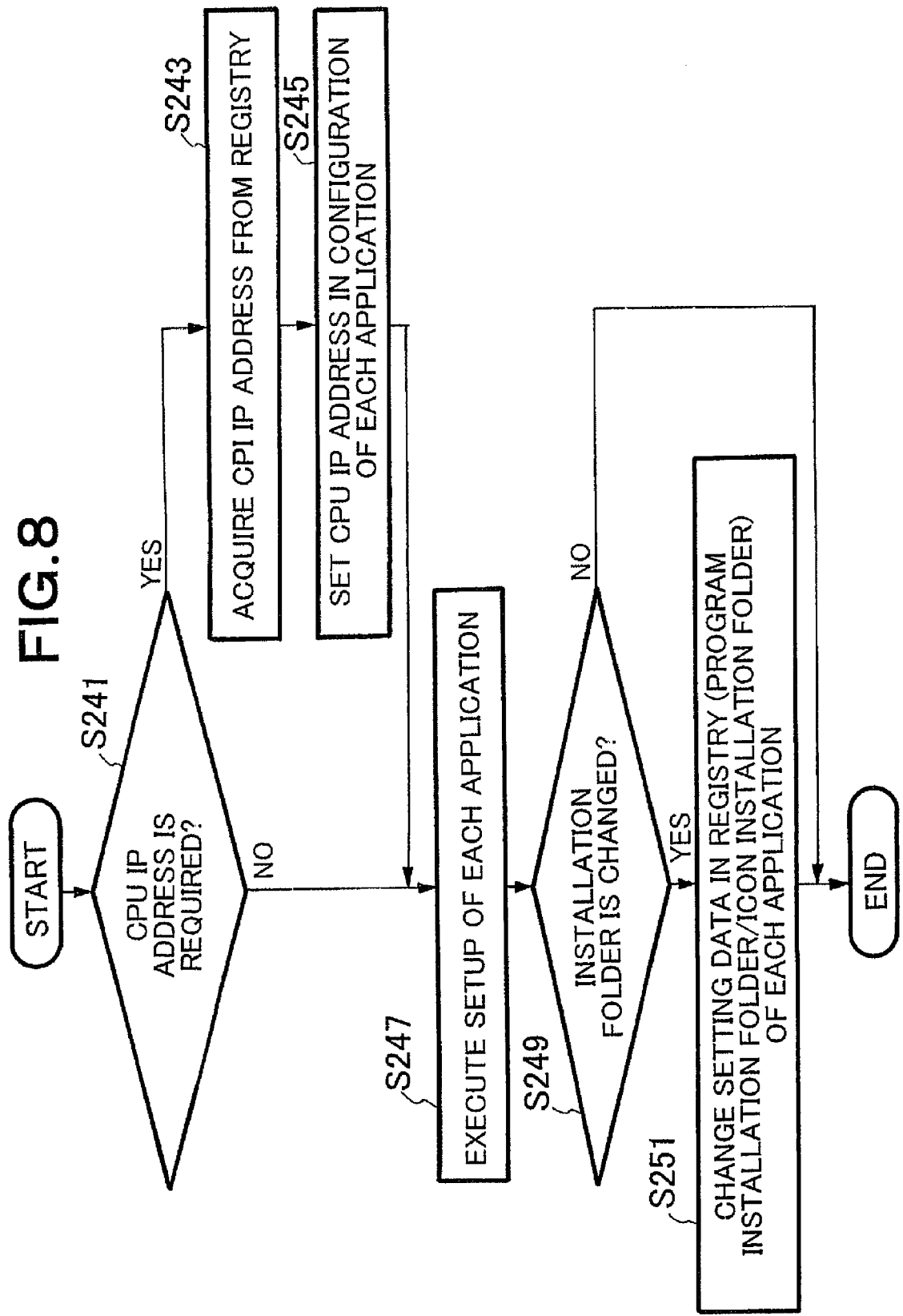
FIG. 8 is a flowchart showing processing of MSI file of each application according to the embodiment of the present invention.

Finally, with reference to FIG. 8, installation processing of each application using the MSI file will be described.

In the case where a relevant application requires CPU IP address setting (YES in step S241), it acquires the CPU IP address from PC registry data (R1-2) (see FIG. 5) and sets the acquired CPU IP address in the configuration file therein.

Thereafter, a setup process specific to each application is executed to set installation destination folder information and icon installation destination folder information of the program specified by the user in program installation folder/file name (Rn-1) and icon installation folder/file name (Rn-2) in the registry of a corresponding PC.

Thus, by using the common installer, it is possible to install a plurality of applications (PC application/browser application) in a uniform manner regardless of application type.

Figure 12:
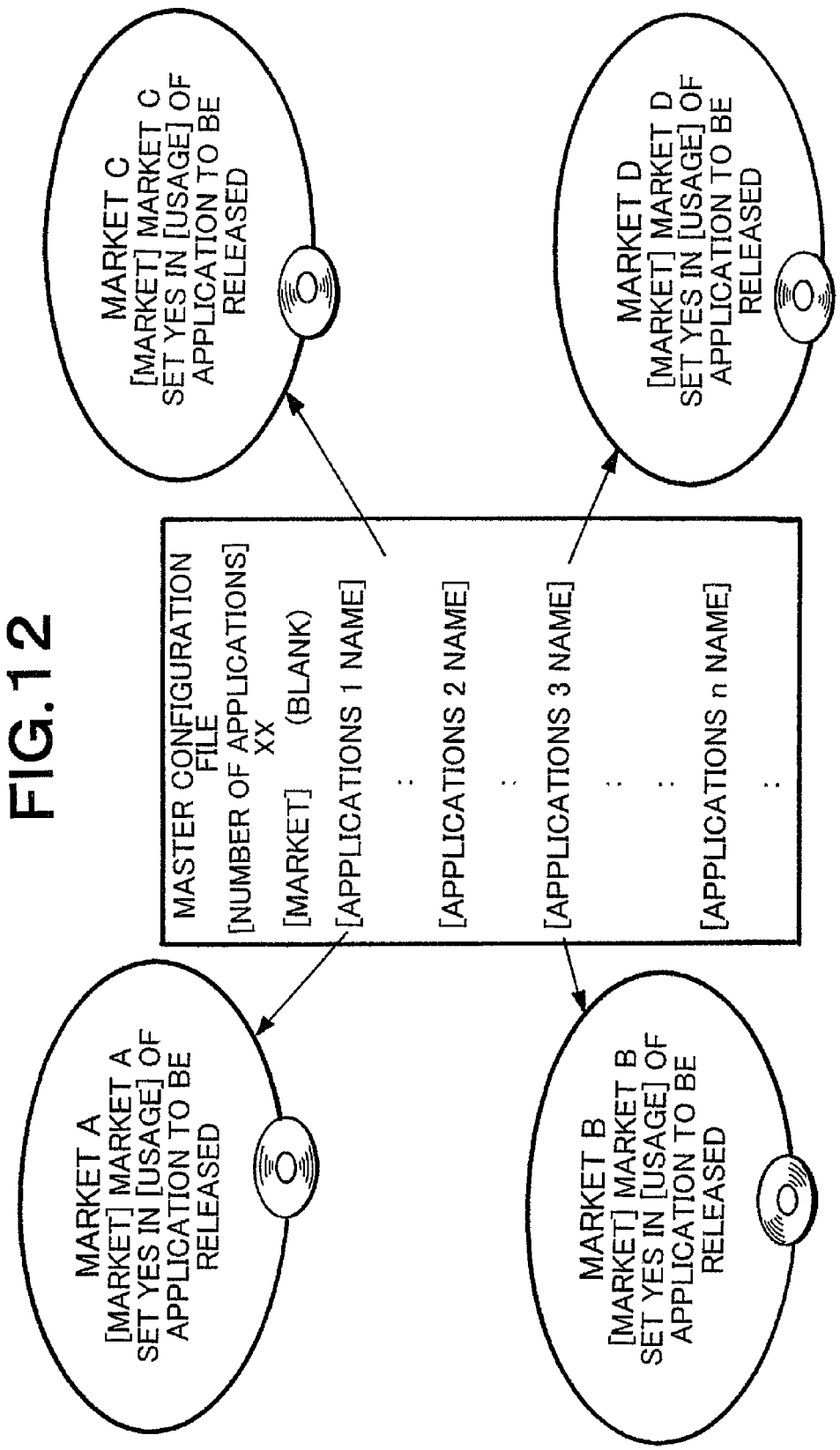
FIG. 12 is a conceptual view showing market-based uniform management of applications.

In addition, as shown in FIG. 12, the configuration file includes application information concerning all markets, so that it is possible to realize market-based uniform management of applications. In the case where a relevant application is sold into another market, it is only necessary to set YES in [Usage] of the configuration file.

Next, an embodiment in which a link between the plurality of installed applications is established using registry data of the PC will be described.

Figure 9:
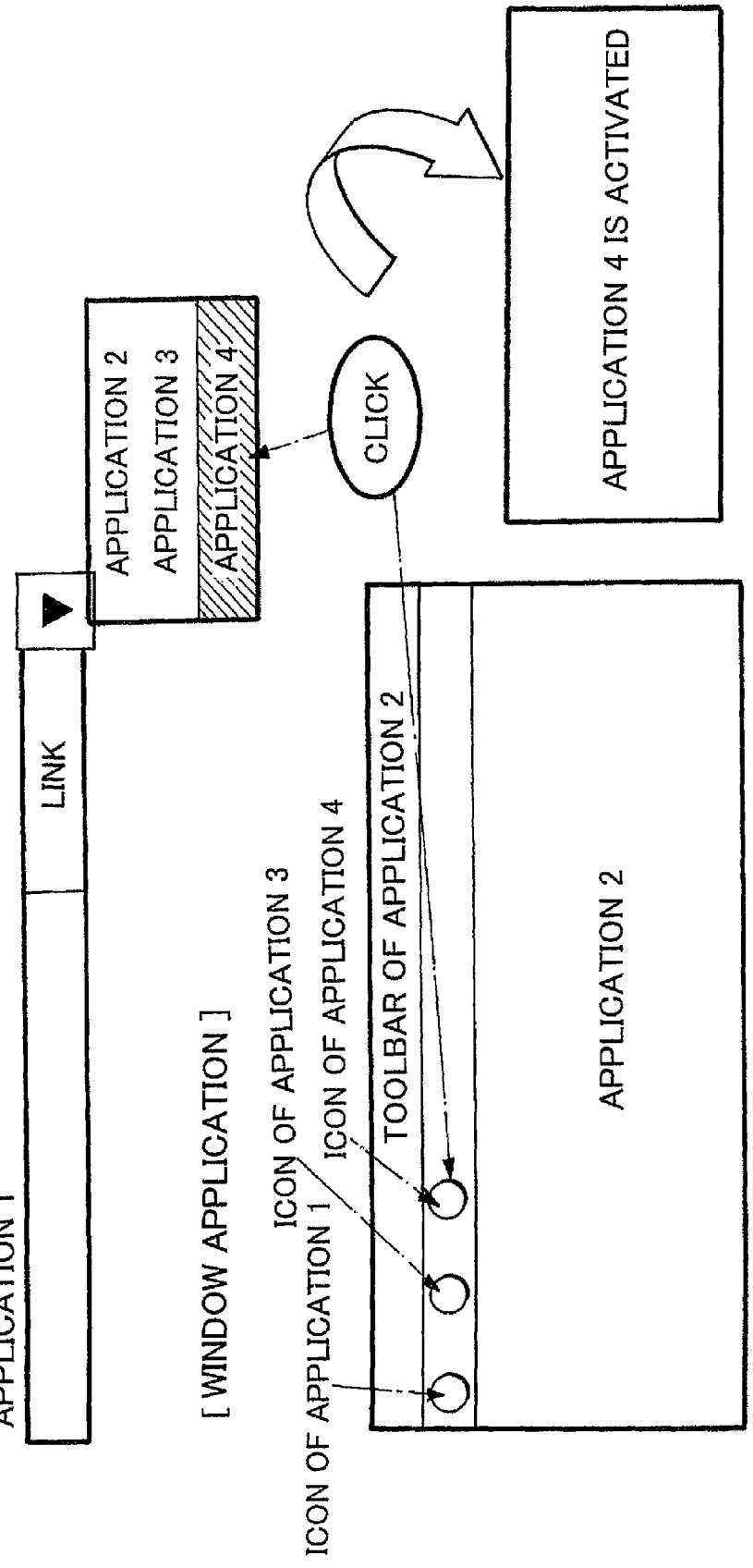
FIG. 9 is an example of a screen showing a link between applications according to the embodiment of the present invention.

FIG. 9 shows a link display form of the application 1 (GUI type: toolbar type) which is used for displaying a link between the application 1 and other applications and a link display form of the application 2 (GUI type: Windows® type) which is used for displaying a link between the application 2 and other applications. The toolbar type includes a pull-down menu for application link so as to allow the user to select any one of other applications.

The Windows® type includes a menu bar for application link so as to allow the user to select any one of other applications. When the user clicks an application name in the pull-down menu or an application icon on the menu bar, the selected application can be activated.

Figure 10:
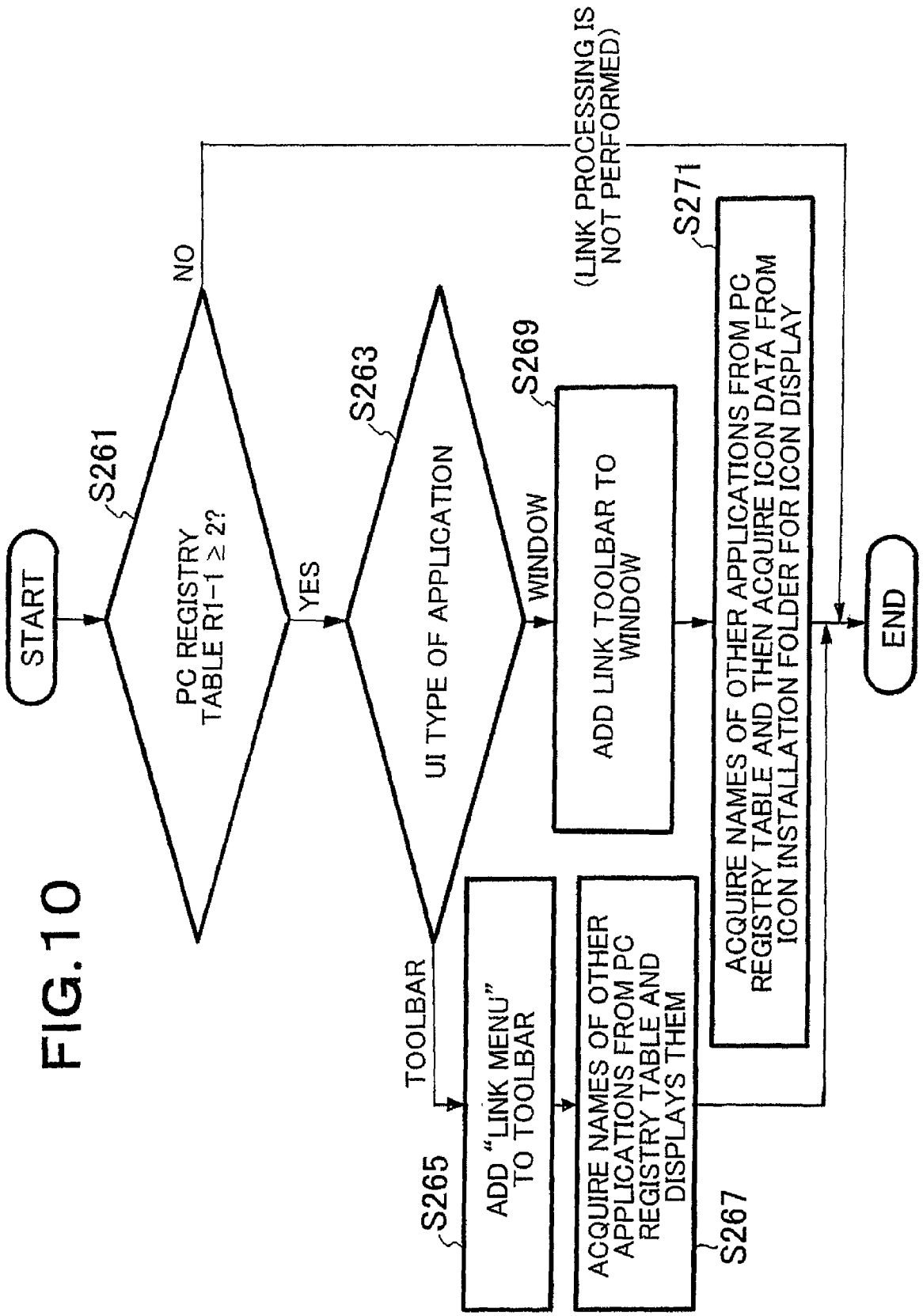
FIG. 10 is a flowchart showing processing for setting a link between applications according to the embodiment of the present invention.

Next, with reference to FIG. 10, a link display processing flow performed in each application will be described.

First, the number of installed applications (FIG. 5 R1-1) (FIG. 4 [Number of Application]) of the registry table in the PC is checked to determine whether any other application has been installed (R1-1≥2) (step S261). In the case where any other application does not exist (R1-1<2) (No in step S261), link processing is not performed.

In the case where the UI type of the relevant application is a toolbar type ("toolbar" in step S263), a "Link" pull-down menu is added to the toolbar (step S265). As the content of the pull down menu, subfolder names of other applications are acquired from the registry table of the PC and displayed on the pull-down menu (step S267).

In the case where the UI type of the relevant application is a Windows® type ("Windows® type" in step S263), a link toolbar is added to the Windows® (step S269). Subsequently, the PC registry table is searched for other applications, and icon files are acquired respectively from icon installation folder/file names of the acquired applications for display on the link toolbar (step S271). After displaying all icons of the acquired applications, this processing flow is ended.

Figure 11:
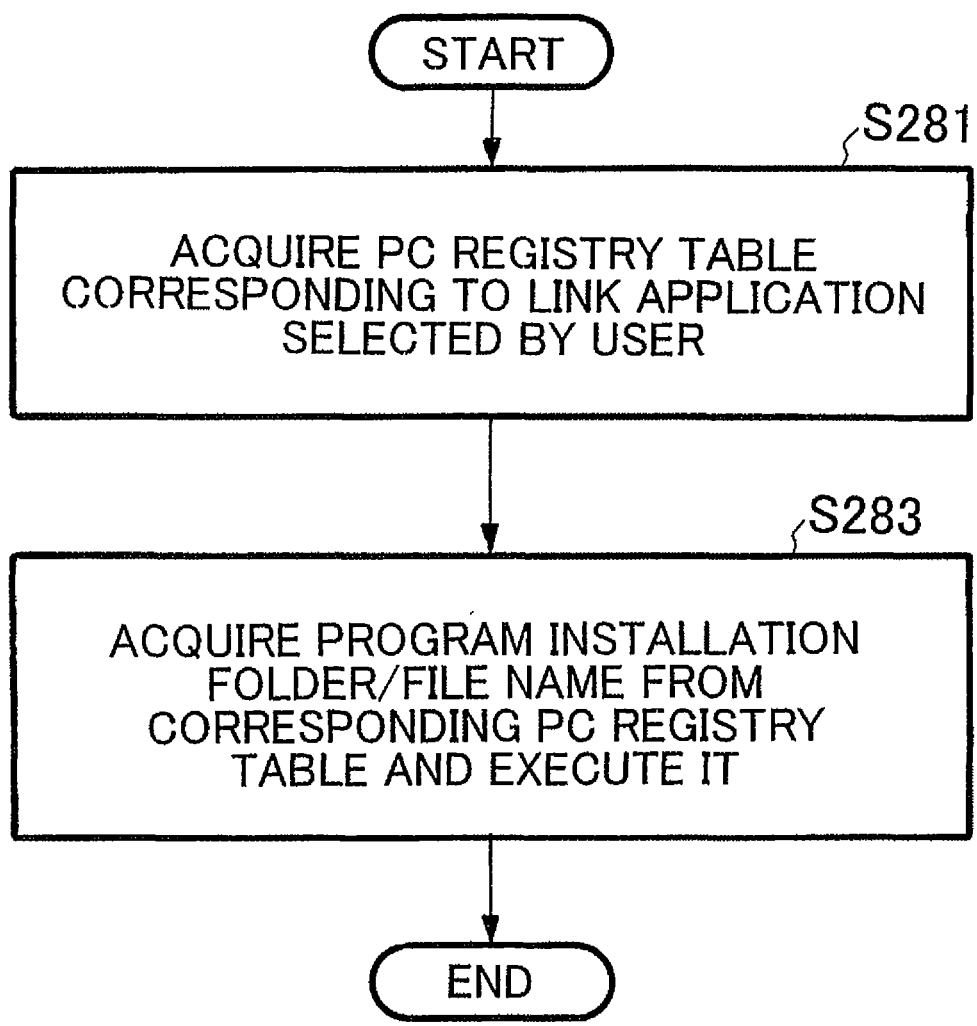
FIG. 11 is a flowchart showing operation performed when a link between applications is selected.

Next, with reference to FIG. 11, a link processing flow in each application will be described.

The PC registry table corresponding to the link application selected by the user is acquired (step S281).

Program installation folder/file name is acquired from the corresponding PC registry table and executed (step S283).

The present invention can be utilized by solution providers such as a communication equipment manufacturer or integrated office application developer.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. An installer system comprising:

a first processor unit that generates an application list and records the generated application list in a storage device of a first computer, the application list containing, for each application to be installed in a second computer, an application program type indicating whether the application to be installed is a PC application or a browser application, an indication of whether the application is to communicate with a Central Processing Unit (CPU), necessity or unnecessity of Personal Computer (PC) reboot after installation, a default installation folder/program name, and a default icon folder/program name, the application program type of the browser application indicating a case where an application program of an application server on a network is utilized through a browser at the second computer;

the first processor unit generating a configuration file to be used for installation, based on the application list stored in the storage device and recording the generated configuration file in a storage medium of the first computer, the configuration file containing a total number of applications to be installed in all markets and a specified market and containing, for each of the applications to be installed, an application name, information indicating whether the application is released or not into the specified market, the application program type indicating whether the application to be installed is a PC application or a browser application, the necessity or unnecessity of communication with the CPU, the necessity or unnecessity of reboot after installation, a program installation path, and an icon installation path;

a second processor unit for setting common items in a registry of the second computer, setting a number of installed applications and an IP address of the CPU as attributes of the common items, setting items for each application immediately under the common items, and setting a program installation folder/file name and an icon installation folder/file name as attributes of the items set for each application;

the second processor unit setting, in a field of the number of installed applications in the registry of the second computer, a number of selected applications which has been determined based on both of user's selection and the information, contained in the configuration file, indicating whether the application is released or not into the specified market;

the second processor unit setting a value of the IP address input by the user in a field of the IP address in the registry of the second computer; and the second processor unit installing, in the second computer, applications selected by the user, wherein the second processor unit performs installation based on a Microsoft Windows.RTM. Installer (MSI) file stored in the storage medium for an application whose application program type contained in the configuration file is a PC application, while, for an application whose application program type contained in the configuration file is a browser application, the second processor unit sets a shortcut for connecting to a Uniform Resource Locator (URL) input by the user and an icon of the shortcut and sets the set destinations of the shortcut and icon in the registry of the second computer, in the installation based on the MSI file, the second processor unit sets, as needed, the IP address that has been set in the registry, in a configuration of the application to be installed in the second computer, and the second processor unit checks the configuration file to determine whether, among the installed applications, at least one application requiring reboot after installation exists, and performs reboot of the second computer only once after installation if the at least one application requiring reboot after installation exists.

2. The installer system according to claim 1, comprising a unit for setting a pull-down menu in a toolbar application, displaying information representing other applications when the pull-down menu is selected, and activating a selected one of the applications on the pull-down menu by referring to the registry.

3. The installer system according to claim 1, comprising a unit for setting a toolbar in a Windows.RTM application, displaying an icon representing other applications on the toolbar, and activating an application corresponding to a selected one of the icons on the tool bar by referring to the registry.

4. An installing method comprising:

a step of generating an application list by a first computer and recording the generated application list in a storage of the first computer, the application list containing, for each application to be installed in a second computer, an application program type indicating whether the application to be installed is a PC application or a browser application, an indication of whether the application is to communicate with a Central Processing Unit (CPU), necessity or unnecessity of Personal Computer (PC) reboot after installation, a default installation folder/program name, and a default icon folder/program name, the application program type of the browser application indicating a case where an application program of an application server on a network is utilized through a browser at the second computer;

a step of generating by the first computer a configuration file to be used for installation, based on the application list stored in the storage and recording the generated configuration file in a storage medium by the first computer, the configuration file containing a total number of applications to be installed in all markets and a specified market and containing, for each of the applications to be installed, an application name, information indicating whether the application is released or not into the specified market, the application program type indicating whether the application to be installed is a PC application or a browser application, the necessity or unnecessity of communication with the CPU, the necessity or unnecessity of reboot after installation, a program installation path, and an icon installation path;

a step of setting common items in a registry of the second computer, setting a number of installed applications and an IP address of the CPU as attributes of the common items, setting items for each application immediately under the common item items, and setting a program installation folder/file name and an icon installation folder/file name as attributes of the items set for each application;

a step of setting, in a field of the number of installed applications in the registry of the second computer, a number of selected applications which has been determined based on both of user's selection and the information, contained in the configuration file, indicating whether the application is released or not into the specified market;

a step of setting a value of the IP address input by the user in a field of the IP address in the registry of the second computer; and an installation step of installing, in the second computer, applications selected by the user, wherein in the installation step, installation is performed based on a Microsoft Windows Installer (MSI) file stored in the storage medium for an application whose application program type contained in the configuration file is a PC application, while, for an application whose application program type contained in the configuration file is a browser application, a shortcut for connecting to a Uniform Resource Locator (URL) input by the user and an icon of the shortcut are set, and the set destinations of the shortcut and icon are set in the registry of the second computer, in the installation based on the MSI file, the IP address that has been set in the registry is set as needed in a configuration of the application to be installed in the second computer, wherein the method further comprises:

a step of checking the configuration file to determine whether, among the installed applications, at least one application requiring reboot after installation exists, and performing reboot of the second computer only once after installation if the at least one application requiring reboot after installation exists.

5. The installing method according to claim 4, comprising setting a pull-down menu in a toolbar application, displaying information representing other applications when the pull-down menu is selected, and activating a selected one of the applications on the pull-down menu by referring to the registry.

6. The installing method according to claim 4, comprising setting a toolbar in a Windows.RTM application, displaying an icon representing other applications on the toolbar, and activating an application corresponding to a selected one of the icons on the tool bar by referring to the registry.

7. a non-transitory computer-readable medium embodying an installing program for allowing a computer to function as an installer system comprising:

a unit for generating an application list by a first computer and recording the generated application list in a storage of the first computer, the application list containing, for each application to be installed in a second computer, an application program type indicating whether the application to be installed is a PC application or a browser application, an indication of whether the application is to communicate with a Central Processing Unit (CPU), necessity or unnecessity of Personal Computer (PC) reboot after installation, a default installation folder/program name, and a default icon folder/program name, the application program type of the browser application indicating a case where an application program of an application server on a network is utilized through a browser at the second computer;

a unit for generating by the first computer a configuration file to be used for installation, based on the application list stored in the storage and recording the generated configuration file in a storage medium by the first computer, the configuration file containing a total number of applications to be installed in all markets and a specified market and containing, for each of the applications to be installed, an application name, information indicating whether the application is released or not into the specified market, the application program type indicating whether the application to be installed is a PC application or a browser application, the necessity or unnecessity of communication with the CPU, the necessity or unnecessity of reboot after installation, a program installation path, and an icon installation path;

a unit for setting common items in a registry of the second computer, setting a number of installed applications and an IP address of the CPU as attributes of the common items, setting items for each application immediately under the common items, and setting a program installation folder/file name and an icon installation folder/file name as attributes of the items set for each application;

a unit for setting, in a field of the number of installed applications in the registry of second computer, a number of selected applications which has been determined based on both of user's selection and the information, contained in the configuration file, indicating whether the application is released or not into the specified market;

a unit for setting a value of the IP address input by the user in a field of the IP address in the registry of the second computer;

and an installation unit for installing, in the second computer, applications selected by the user, wherein the installation unit performs installation based on a Microsoft Windows Installer (MSI) stored in the storage medium file for an application whose application program type contained in the configuration file is a PC application, while, for an application whose application program type contained in the configuration file is a browser application, the installation unit sets a shortcut for connecting to a Uniform Resource Locator (URL) input by the user and an icon of the shortcut and sets the set destinations of the shortcut and icon in the registry of the second computer, in the installation based on the MSI file, the installation unit sets, as needed, the IP address that has been set in the registry, in a configuration of the application to be installed in the second computer, and the installation unit checks the configuration file to determine whether, among the installed applications, at least one application requiring reboot after installation exists, and performs reboot of the second computer only once after installation if the at least one application requiring reboot after installation exists.

8. The non-transitory computer-readable medium according to claim 7, wherein the installer comprises a unit for setting a pull-down menu in a toolbar application, displaying information representing other applications when the pull-down menu is selected, and activating a selected one of the applications on the pull-down menu by referring to the registry.

9. the installing program non-transitory computer-readable medium according to claim 7, wherein the installer comprises a unit for setting a toolbar in a Windows.RTM application, displaying an icon representing other applications on the toolbar, and activating an application corresponding to a selected one of the icons on the tool bar by referring to the registry.

\* \* \* \* \*